United States Patent
Sönsteröd et al.

(10) Patent No.: US 9,670,982 B2
(45) Date of Patent: Jun. 6, 2017

(54) PRESSURE REGULATOR FOR SHOCK ABSORBER VALVE

(71) Applicant: ÖHLINS RACING AB, Upplands Väsby (SE)

(72) Inventors: Lars Sönsteröd, Sandared (SE); Arnold Hovén, Jönköping (SE)

(73) Assignee: ÖHLINS RACING AB, Upplands Väsby (SE)

( * ) Notice: Subject to any disclaimer, the term of this patent is extended or adjusted under 35 U.S.C. 154(b) by 0 days.

(21) Appl. No.: 14/305,337

(22) Filed: Jun. 16, 2014

(65) Prior Publication Data

US 2014/0291091 A1 Oct. 2, 2014

Related U.S. Application Data

(62) Division of application No. 13/000,514, filed as application No. PCT/SE2009/000319 on Jun. 23, 2009, now Pat. No. 8,770,363.

(30) Foreign Application Priority Data

Jun. 25, 2008 (SE) ..................... 0801492

(51) Int. Cl.
*F16F 9/34* (2006.01)
*F16F 9/46* (2006.01)

(52) U.S. Cl.
CPC ................ *F16F 9/34* (2013.01); *F16F 9/464* (2013.01); *Y10T 137/7793* (2015.04)

(58) Field of Classification Search
CPC .......... F16K 1/12; F16K 1/126; F16K 15/021; F16K 17/0493; Y10T 137/7793;
(Continued)

(56) References Cited

U.S. PATENT DOCUMENTS 4,535,816 A 8/1985 Feder et al.
4,546,955 A 10/1985 Beyer et al.
(Continued)

FOREIGN PATENT DOCUMENTS

DE 26 55 811 A1 6/1978
DE 10 2006 016 473 A1 6/2007
WO 2006135319 A1 12/2006

OTHER PUBLICATIONS

Merritt, Herbert E., "Hydraulic Control systems", John Wiley & Sons, Inc., 1967, p. 319-333.*
(Continued)

*Primary Examiner* — Anna Momper
(74) *Attorney, Agent, or Firm* — Ladas & Parry LLP

(57) ABSTRACT

The invention relates to a pressure regulator in a shock absorber valve. The pressure regulator comprises an axially movable first valve part and a first seat, which are arranged in a valve housing in such a way that an adjustable flow opening is created between the parts. The flow opening is arranged to restrict a damping medium flow (q) and its flow opening size (s) is determined by a force balance on the first valve part. The force balance is principally or partially created by the sum of an actuating force (F) and the force (Fs) from a spring arrangement counter to the action of a counter holding regulator force (R). The spring arrangement comprises a first spring having a first spring constant (k1) and a second spring having a second spring constant (k2). The counter holding regulator force (R) is determined by the spring characters of both the first and the second spring, in which the first spring interacts with the actuating force (F) throughout the stroke (S1) and the second spring works in series with the first spring in an initial stroke (S3) close to the seat, in which the size of the initial stroke is determined by the working range of the second spring.

20 Claims, 5 Drawing Sheets

(58) Field of Classification Search
CPC ......... Y10T 137/7797; Y10T 137/7801; Y10T 137/7822; Y10T 137/7823; Y10T 137/7826; Y10T 137/7827; F16F 9/34; F16F 9/464
USPC .... 188/322.13, 322.2, 315, 266.6, 275, 314; 251/149.6, 282, 337, 129.15
See application file for complete search history.

(56) References Cited

U.S. PATENT DOCUMENTS

| | | | | |
|---|---|---|---|---|
| 4,635,683 | A | * | 1/1987 | Nielsen ............... H01F 7/13 137/625.65 |
| 5,398,787 | A | | 3/1995 | Woessner et al. |
| 5,551,541 | A | | 9/1996 | Forster |
| 5,937,975 | A | | 8/1999 | Forster |
| 6,000,508 | A | * | 12/1999 | Forster ............... F16F 9/46 188/299.1 |
| 6,044,939 | A | | 4/2000 | Forster |
| 8,136,644 | B2 | | 3/2012 | Sonsterod |
| 2008/0116024 | A1 | | 5/2008 | Heyn et al. |

OTHER PUBLICATIONS

Extended European Search Report dated Oct. 9, 2014; Appln. No. 09770466.2-1755 /2307760 PCT/SE2009000319.
USPTO NFOA dated Aug. 16, 2013 in connection with U.S. Appl. No. 13/000,514.
USPTO NOA mailed Feb. 28, 2014 in connection with U.S. Appl. No. 13/000,514.

* cited by examiner

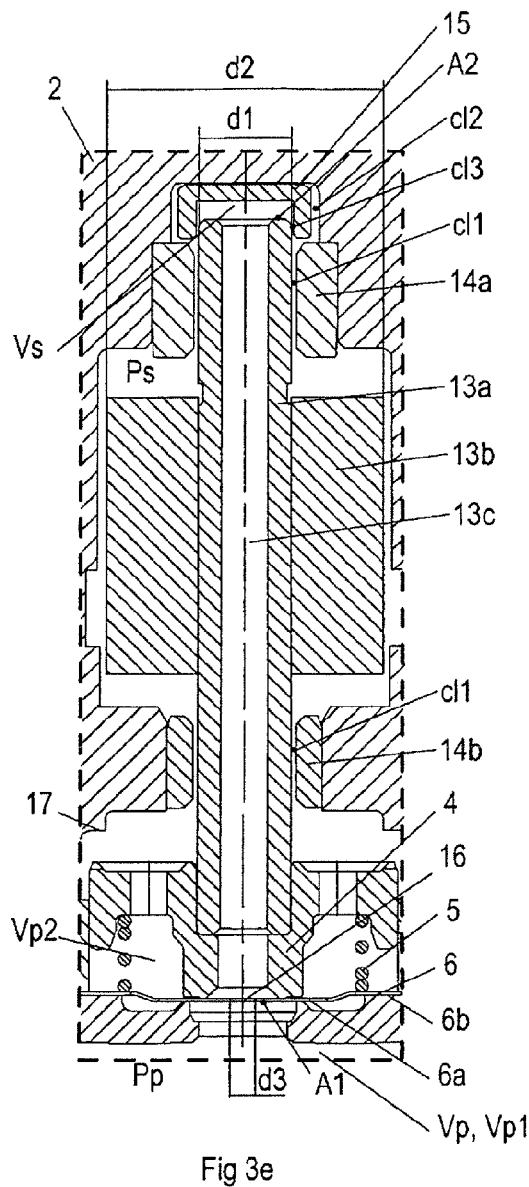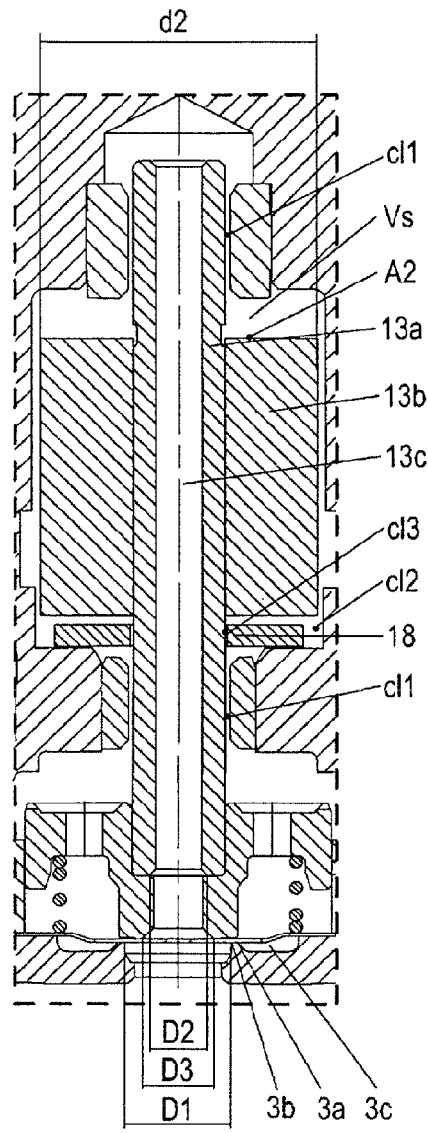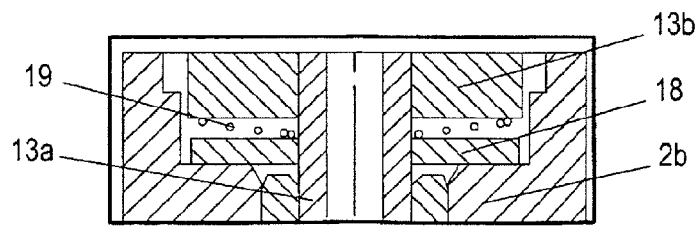

PRESSURE REGULATOR FOR SHOCK ABSORBER VALVE

TECHNICAL FIELD

The invention relates to a pressure regulator comprising a spring arrangement intended to determine the pressure in a damping medium flow between the damping chambers of a shock absorber.

BACKGROUND OF THE INVENTION

Within shock absorber valve technology, a clear need has arisen to produce a pressure regulator having a bleeder-like character, which means that its opening pressure must as far as possible approach zero when the flow approaches zero. The pressure regulator must additionally have a low "blow off" or "cracking pressure" opening point, here referred to as the opening pressure, for all settings, modulations or spring biases, despite the fact that at higher pressures it must generate high pressures within the working range.

A known embodiment of a pressure regulator having a bleeder-like character comprises a spring arrangement consisting of a first spring and a second spring, in which the first spring biases the second spring and contributes to different spring characters in different parts of the stroke. A low spring constant is used initially at the start of the stroke and the low spring constant then transforms into a higher spring constant which is suited to high pressures and dynamic sequences in connection with rapid damping motions. The broken character here produces a low spring constant close to the closed position with a view to giving an accurate setting of the bias. In order to stabilize the valve behavior and avoid noise problems caused by friction forces when the valve changes from closed to open position and vice versa, the accurately set valve must be given an extremely low bias. Such extreme accuracy per se leads to a more expensive production process, but still has lower costs compared with the accuracy which is demanded in the process if low bias is to be achieved with just a stiff spring.

Due to this noise problem and difficulties with the accuracy for the length tolerances of springs, pressure regulators including only one spring, for example shock absorber check valves, must instead be given a high bias in the closed position, which sometimes leads to difficulties in attaining the desired low damping levels for low speeds and small valve flows.

The above-described problems apply to all biased cone valves, pilot valves, pilot-controlled valves and direct-controlled valves, including check valves. The common denominator of these valves is that the pressure which is regulated acts in an opening direction upon an area, here referred to as the opening valve part area, arranged on a movable valve part, so that a feedback opening force is generated. The level of the pressure is determined by a closing actuating force acting counter to the opening force. The closing actuating force is created by the force from an electric, hydraulic or pneumatic actuator, such as a solenoid, and/or by the force from a pilot pressure acting upon a pilot area and/or by the force from a biased spring assembly.

The problem with achieving an initially high spring constant which balances the actuating force on a movable valve part is especially marked in the construction of adjustable valves for a shock absorber for a vehicle suspension. In the construction of an adjustable shock absorber valve for a vehicle, there are two conflicting construction requirements. The damping of the unsprung mass, for example the wheels, is best realized with a valve in which the pressure derivative of the flow (dP/dQ) can be varied. The damping of the sprung mass is best realized with a valve in which a pressure level can be set which is independent of the flow. In the prior art relating to pressure level regulation, the pressure level is set by a master control unit, which works out the desired pressure level and sets this by varying the flow to the valve, i.e. by varying the actuating force created, for example, by a solenoid.

A known design within the field of the invention is described by the Applicant's published patent application WO2006135319, in which the closing actuating force of a pilot stage in a shock absorber valve is determined by the force from an actuator.

In this patent application there is described a shock absorber valve/pressure regulator in the form of a pilot-controlled two-stage valve, intended to control a damping medium flow between the two damping chambers of a hydraulic shock absorber. The shock absorber valve comprises a valve housing with at least one main valve having a movable valve part in the form of a main cone disposed between a main valve spring arrangement and a seat, and a pilot valve comprising a pilot slide. The main cone delimits a pilot chamber in the valve housing, in which the valve main spring and the pilot slide are disposed. The characteristics of the shock absorber valve are principally controlled by the pressure build-up in the pilot chamber, which is adjusted by the position of the pilot slide in the pilot chamber. The position is determined by the force balance between the spring force of a pilot spring and the counter-holding actuating force from an electrically controlled actuator, but also by the feedback pressure opening force created by the pressure in the pilot chamber. This type of pressure regulator is thus controlled with pressure regulation.

Another variant of a shock absorber valve with regulation of the pilot stage is described in U.S. Pat. No. 5,398,787. Here too, a pressure-regulated pilot stage is shown, in which the position of the pilot cone is controlled by the solenoid force, the spring force and the hydraulic forces against which it works. By virtue of the configuration of the outer dimensions of the pilot valve, the hydraulic forces deriving from a given spring constant are controlled within the whole of the working range. This construction is described as a function of the choice of components and will regulate either as a pressure regulator or as a bleeder valve. Nor in this solution is the possibility indicated of achieving both a bleeder-like character and a pressure regulator character in one and the same valve.

In U.S. Pat. Nos. 5,937,975 and 6,044,939, a further variant of a shock absorber valve is shown. Two springs, a stiff spring and a pliable spring, work in series to regulate the position of the pilot stage. These springs are coupled to enable a certain damping even when the valve is currentless and is ceasing to regulate. The stiff spring is active throughout the normal working range and the pliable spring is only active when the pilot stage is so far open that no further regulation of the damping is possible by varying the pressure balance of the pilot stage. This construction will regulate solely as a bleeder valve. Nor in this solution is the possibility indicated of achieving both a bleeder-like character and a pressure regulator character in one and the same valve.

The pilot valve in patent WO2006135319 can be said to have solely a pressure regulator character, and thus to be only pressure-regulating. The pilot valve in U.S. Pat. No. 5,937,975 can be said either to have a bleeder character, and thus to be purely position-regulated, or to have a purely pressure-regulating character. In a position-controlled pilot stage, a construction is sought in which the position of the pilot cone is fully controlled by the actuating force and the force from the spring against which it works, i.e. it is unaffected by the pressure. The position of the cone shall thus not be affected by either the flow through the valve or the pressure loss across the valve. In the position-regulated pilot stage, which is described in U.S. Pat. Nos. 5,937,975 and 6,044,939, a construction of the pilot valve is sought in which the pressure loss always approaches zero whenever the flow through the valve approaches zero. Essentially, a position regulation produces a valve character in which the opening pressure always starts at zero and increases with increasing flow, whereas a pressure regulation generally produces characters which start at a flow-dependent opening pressure and have a gently increasing pressure as the flow increases.

No solution is known in which pressure regulators having the above characteristics in the form of pressure and position regulation are mutually combined.

OBJECT OF THE INVENTION

The present invention relates to a pressure regulator which combines position regulation within one part of the pressure range with pressure regulation within another part of the range. The lower part of the pressure range can be given a strongly increasing pressure derivative with respect to the flow and the upper part of a gently increasing pressure derivative with respect to the flow.

The pressure regulator also comprises a spring arrangement which allows an accurate initial force equilibrium of a first movable valve part in relation to a seat.

The invention also sets out to create a pressure regulator having a robust construction which is relatively insensitive to tolerances.

The invention further aims to create a pressure regulator having a spring arrangement which is small in dimension and is cheap and easy to assemble, produce and adjust.

SUMMARY OF THE INVENTION

The pressure regulator according to the invention is intended for use in a shock absorber valve and comprises an axially movable first valve part and a first seat, which are arranged in a valve housing in such a way that an adjustable flow opening is created between the parts. The adjustable flow opening is arranged to restrict a damping medium flow, and the size of its flow opening, i.e. the distance between the first valve part and the seat, is determined by a force balance on the first valve part. The force balance is principally or partially created by the sum of an actuating force and the force from a spring arrangement counter to the action of a counterholding pressure regulator force. The spring arrangement comprises a first spring having a first spring constant and a second spring having a second spring constant. The invention is characterized in that the counterholding regulator force is determined by the spring characters of both the first and the second spring. The first spring interacts with the actuating force throughout the stroke and, at the same time, the second spring works in series with the first spring only in an initial stroke close to the seat, in which the size of the initial stroke is determined by the limited working range of the second spring. The limited working range of the second spring is defined by the possible axial deformability of the spring, so that it only interacts with the actuating force during a part of the total stroke.

In this way, the total counterholding spring force during the initial stroke is high, with a high pressure derivative created by a restriction of the damping medium flow through the flow opening. There the flow opening size of the flow opening is largely determined by the spring constant of both the first and the second spring up to a first flow opening size. At low modulation, i.e. lower modulated pressure levels, the counterholding regulator force, and hence the pressure level in the damping medium, increases with increasing flow, since the pressure increase, i.e. the position of the valve part, is substantially determined by the high spring constant of the second spring. This means that the force balance between actuating force, spring force and regulator force is dominated by actuating force and spring force, more than in a position regulation, at these lower pressure levels. The actuating force which is active in the lower part of the pressure range is dominated by the initial bias of the valve in a spring with very high spring constant and in the upper part of the electric current range the dominance in the force balance essentially consists of actuating force and pressure feedback. The pressure regulator in this case determines the pressure in the damping medium flow, so that its opening pressure approaches zero when the flow approaches zero, at the same time as, at higher pressures, it has a steep, but blowing-off pressure-regulating character.

At high modulation, i.e. higher modulated pressure levels, the counterholding regulator force, and hence the pressure level in the damping medium, is substantially determined by the feedback pressure, more than in a pressure regulator, since the force balance between actuating force, spring force and regulator force is in this case dominated by actuating force and regulator force.

The interaction of the spring constant is created by the fact that the first valve part and at least a part of the second spring bear against each other and move in tandem as a unit during the initial stroke until the second spring has reached its basic position and no forces are acting upon the spring.

In one embodiment of the invention, the first spring has a much lower spring constant than the second spring. The initial stroke is thus given a very well-defined low bias, i.e. a low pressure during the initial stroke close to the seat, and desired high spring forces during the rest of the stroke. This gives the desirable low pressure which approaches zero when the flow approaches zero.

In a second embodiment of the invention, the first and/or the second spring has/have the form of a washer having an inner and an outer spring part. The inner and the outer spring part are connected in at least two places to resilient bridges such that the outer and the inner spring part can spring in relation to each other and be displaced relative to each other. The flat, washer-shaped spring gives a well-defined distance to the valve seat. A critical force balance level on the first valve part can thus be accurately attained by the first spring having a well-defined first spring constant. The flat, washer-shaped spring has very high spring constant and is progressive with increasing force, as the valve part stroke becomes ever smaller. This gives an increased spring constant the closer the seat comes to the first valve part, which is an advantage.

During the initial stroke, the inner spring part of the second spring is preferably displaced relative to the outer spring part. This displacement is realized when the movable first valve part presses against the inner spring part of the second spring, at the same time as the outer spring part is clamped in place between the valve housing and the first seat.

In a preferred embodiment, it is the inner spring part of the second spring which bears against and seals against the first valve part during the initial stroke. As a result of this bearing contact, the second spring constitutes an adjustable flow opening toward the seat through the creation of a restriction of the damping medium flow when the damping medium flows in the flow-through holes in the interspace between the inner and the outer spring part. The adjustable opening creates a damping of the motion of the first valve part during the initial stroke.

In a further embodiment, a further damping of the motion of the first valve part is created by the arrangement of at least one damping hole in the inner spring part of the second spring. As a result of this damping hole, the flow of the damping medium is further restricted, which contributes to the increased damping.

In a preferred embodiment of the invention, the pressure regulator regulates a pilot pressure which determines a main damping medium flow across a main valve in the shock absorber.

The main valve comprises a second valve part, which is arranged to move axially in relation to a second seat counter to the action of a third spring and the pilot pressure determined by the pressure regulator. Thus the pressure regulator is used in this case in a two-stage, adjustable and pilot-controlled valve for a shock absorber for a vehicle suspension. This adjustable two-stage valve requires for optimal valve function a very controlled and low counterforce of the spring arrangement in combination with pressure flow curves which point toward zero for motions close to the seat of both or either one of the movable valve parts, i.e. at low damping medium flow velocity.

The invention is described in greater detail below, with references to the accompanying drawings.

LIST OF FIGURES

FIGS. 1a-c show a simplified diagram of a valve according to a first embodiment with different opening level stages.

FIGS. 2a-c show a simplified diagram of a valve according to a second embodiment with different opening level stages.

FIG. 3a shows the valve according to the third embodiment, coupled with a shock absorber.

FIGS. 3b-d show the valve according to the third embodiment, when different large forces act upon the valve.

FIGS. 3e-g show further embodiments of the invention.

DETAILED DESCRIPTION OF THE INVENTION

Figure 1A:
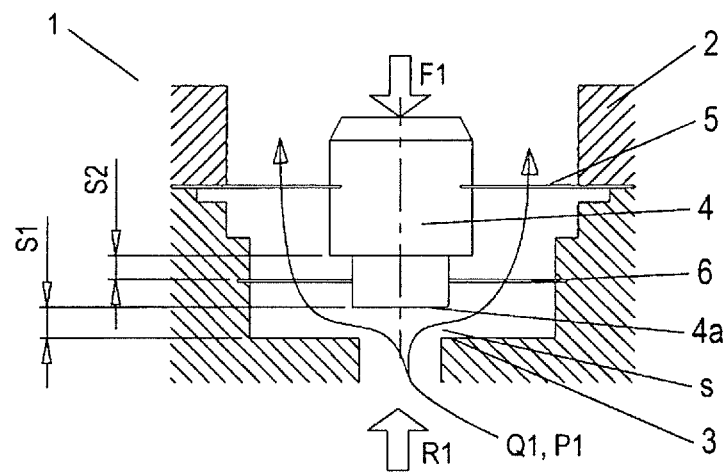
Figure 1B:
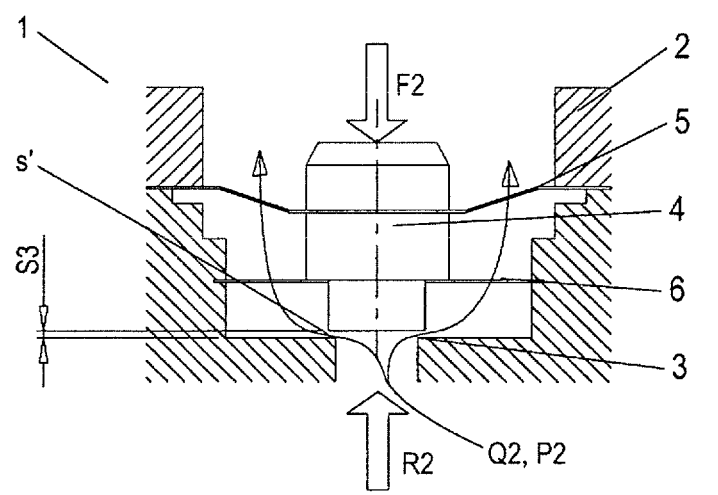
Figure 1C:
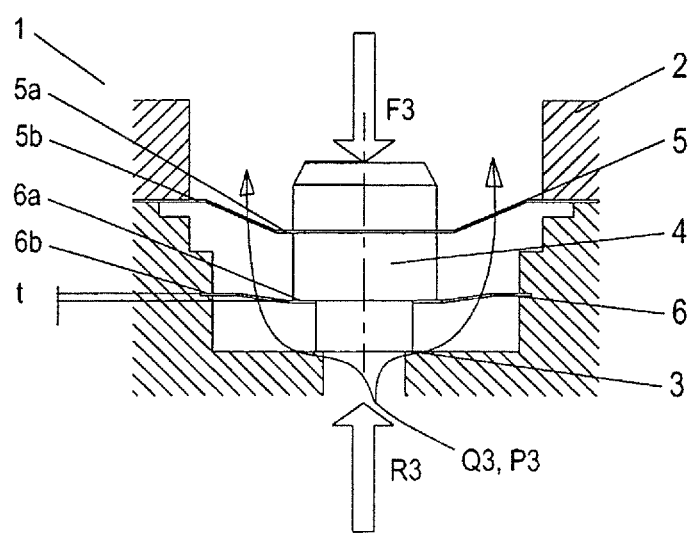
Figure 2A:
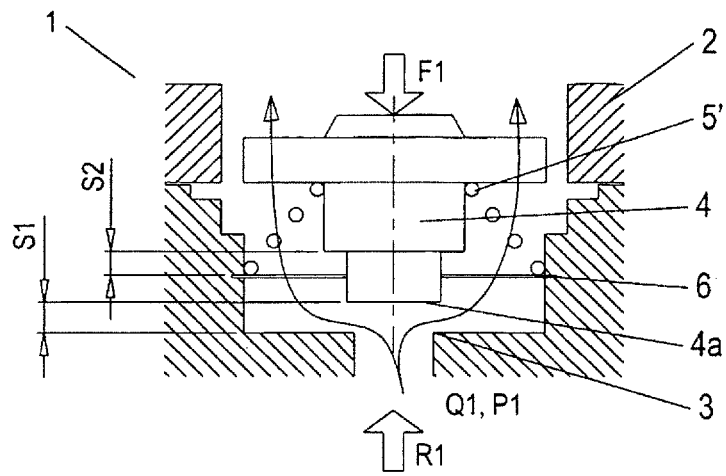
Figure 2B:
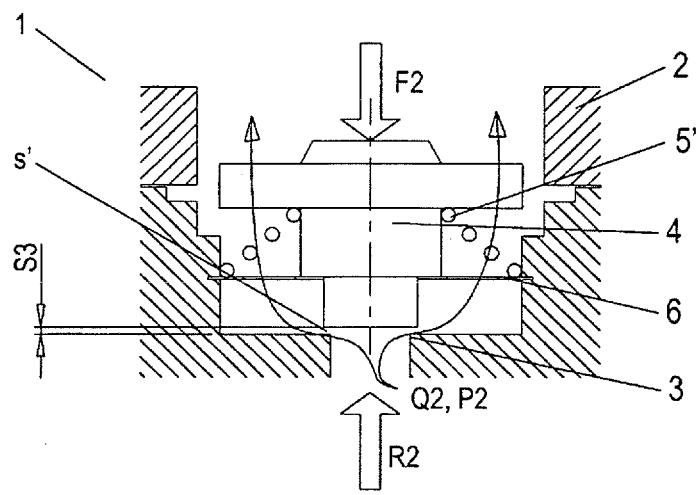
Figure 2C:
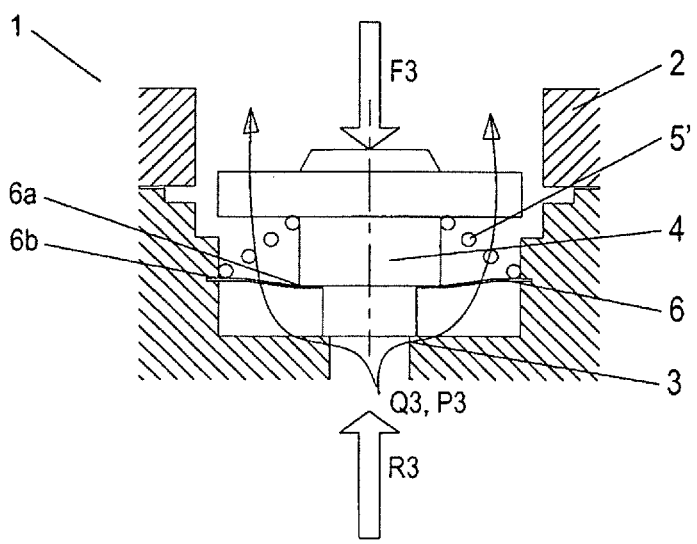

FIGS. 1a-1c show a first embodiment of the invention and FIGS. 2a-2c show a second embodiment of the invention, which is a pressure regulator in the form of a valve 1, principally intended to adjust the pressure P1 to P3 of a damping medium flow Q1 to Q3 in a shock absorber. The damping medium flow is created when a motion in a shock absorber creates a pressure difference across a main piston dividing the shock absorber into two damping chambers, see also FIG. 3a. The valve 1 has a valve housing 2, and a first valve part 4 which is axially movable therein. The motional options of the axially movable first valve part 4 are curtailed by a first seat 3, which can be integrated in or separated from the valve housing. When the valve is open, the damping medium Q1-Q3 flows in the passage having a variable flow opening s, which is created between the valve part 4 and the seat 3. The axially movable valve part 4 is acted upon in many cases firstly by an actuating force F, the force of which varies between F1 and F3, acting upon the movable valve part 4, and secondly by a counterholding force R1-R3 created by the size of F and a spring arrangement comprising a first spring 5 and a second spring 6 having a first and a second spring constant k1, k2 respectively.

In the operating situation where F~0 or low, i.e. when the valve is open as in FIGS. 1a and 2a, the total counterholding force R1 is created by only the first spring 5. The first spring 5 works against the actuating force F throughout the stroke, but the second spring 6 works simultaneously with the first spring 5 under a limited working range in an initial stroke close to the seat 3 as in FIGS. 1b-1c.

The limited working range is defined by the possible axial deformability of the second spring 6, i.e. the magnitude of the total deformation of the spring from its basic length in the force-unaffected state when it is subjected to the actuating force F. Strokes close to the seat 3 correspond to flow openings s of between zero and a desired flow opening size s', which can preferably be about half to one-tenth of the total stroke S1. Both springs act here in the opening direction counter to the actuating force F acting in the closing direction.

In FIGS. 1a and 2a, the actuating force F1 is small compared with the actuating forces F2 and F3, and thus the pressure P1 which is dependent on the flow Q1 and which acts upon the movable valve part 4 is also low, so that the regulator force R1 is also small. The two springs, both of the shim type in FIG. 1, or one shim type and one wire-wound in FIG. 2, hold the valve part 4 in a relatively open position in FIGS. 1a, 2a. The zero position in the calculation of spring force is based on the basic position where both the springs are unloaded, as is shown in FIGS. 1a and 2a.

The valve part 4 moves axially in the valve housing 2 by a certain stroke S, which can be divided into a first, second and third valve part stroke, S1, S2 and S3. The stroke S is dependent on the geometry of the valve, as well as on the force relationship on the valve part 4, which is created by the actuating force F, the regulator force R, the forces contributed by the springs 5, 6, and the size of the flow Q. The first valve part stroke S1 can also be referred to as the total stroke and is defined as the distance between the seat edge 3a and the bottom face 4a of the movable valve part for a fully open valve, and the second valve part stroke S2 is calculated as the distance over which the valve part 4 can move without the influence of the second spring 6. During the second valve part stroke S2, the force balance on the movable valve part 4 is thus determined by the interaction between F1 and the first spring 5 while the second spring 6 is inactive. The second spring 6, when inactive, can be said to be in its basic position, which means that it is free from load and there is no force acting upon it. The first spring 5 has a significantly lower spring constant k1 than the spring constant k2 of the second spring 6. Preferably, the ratio between the spring constants k1 and k2 is somewhere between 1:6 and 1:220, i.e. a broad selection of function modes. For a car, for example, spring constants k1=0.5-2 N/mm, k2=15-110 N/mm are obtained.

In FIGS. 1b and 2b, the actuating force F2 is sufficiently large to overcome the regulator force R and the spring forces and lift the valve part 4. The valve part 4 regulates in the case in the vicinity of the seat 3, the higher pressure P2, which is dependent on the flow Q2, and the regulator force R2 being determined by an increased actuating force F2, as well as by the biased spring arrangement. The actuating force F2 can thus virtually be defined as F2<=the spring force. The spring force within the range s', which can be said to be a first flow opening size desired for the function, is k1*S2+(k1+k2)*(s'−S3). There S3 corresponds to a third initial valve part stroke when the second spring 5, too, is working, which is defined as the difference between the first and the second valve part stroke, i.e. S1-S2. The third valve part stroke S3 has a maximal flow opening s corresponding to the desired flow opening s'. Thus, for strokes smaller than or equal to S3, the valve regulates the damping medium flow with a bleeder-like character at lower actuating forces F2. The bleeder-like character gradually transforms into a pressure regulator character for high actuating forces S2. This is based on an interaction between the actuating force F2 and the spring forces of the two springs 5 and 6.

FIGS. 1c and 2c show the valve in the vicinity of the closed position, corresponding to Q>=0 and an actuating force F3>=the spring force k1*S2+(k1+k2)*(s'−S3), when the pressure P3 dependent on the flow Q3 is high and greater than P2 and when the flow Q>0. The valve operates in this case at opening pressure and its function has transformed into a pressure regulator function with opening pressure which can be said to correspond to P3. The movable valve part 4 has moved by a distance corresponding to the third valve part stroke S3, i.e. in total, the part 4 has moved by the stroke length S<=S1 in the closing direction.

Thus the total counterholding maximum regulator force R3, i.e. the sum of actuating force and spring force, increases during the initial stroke S3 with an increasing pressure derivative created by a restriction of the damping medium flow Q3 through the flow opening between the seat 3 and the movable valve part 4. The size of the flow opening is determined by the spring constant k1, k2 of both the first 5 and the second spring 6 up to a first flow opening size s'. In the remaining stroke S2, the counterholding regulator force R2 increases with an increasing pressure level in the damping medium in which the pressure increase is determined by just the spring constant k1 of the first spring 5. Preferably, the pressure P2 is at a sufficiently low level that the valve part 4 in this position is in motion either into a position according to FIG. 1a or FIG. 1b.

Figure 4A:
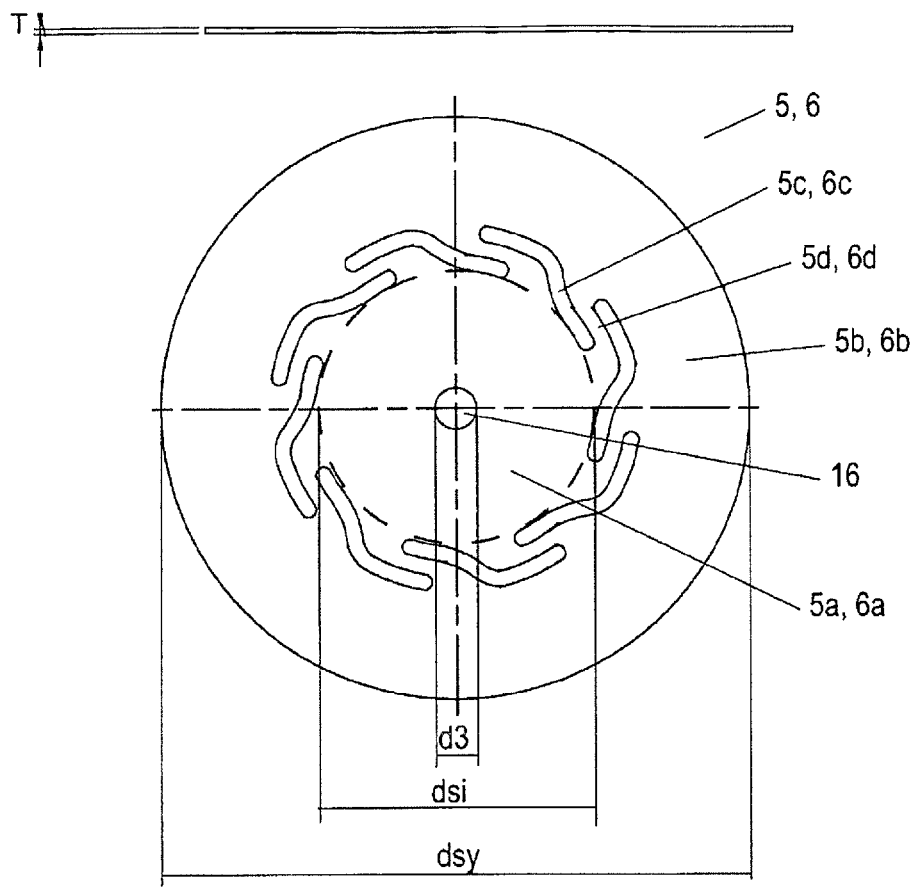
FIG. 4a shows a first embodiment of the first and/or second spring in the spring arrangement in the pilot spring stage.
Figure 4B:
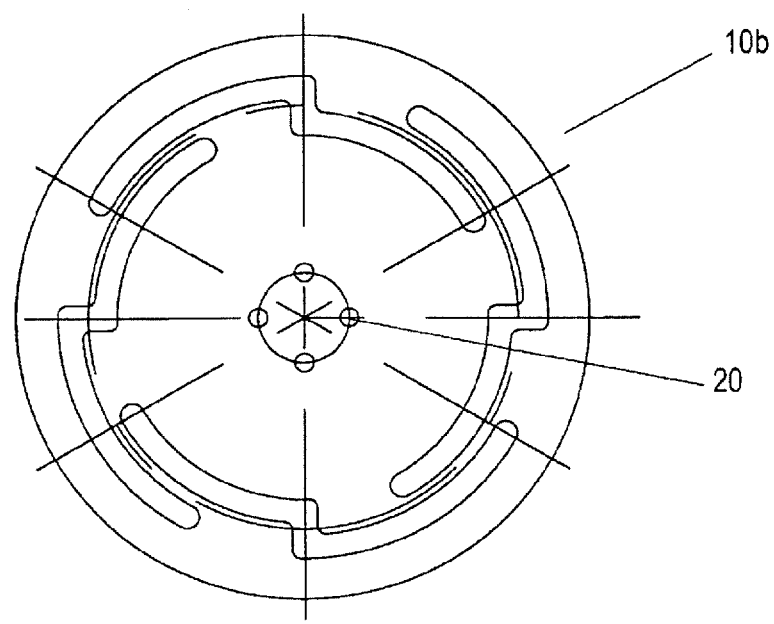
FIG. 4b shows an embodiment of the main valve spring of the main stage.

In the first embodiment in FIGS. 1a-1c, the springs 5, 6 are of the shim type, see also FIG. 4a, 4b. They are thus produced from a thin, circular washer and are configured with an outer 5b, 6b and an inner 5a, 6a spring part which are mutually connected with resilient bridges 5d, 6d, so that the outer and the inner spring part can spring relative to each other. Between the bridges 5d, 6d and the respective spring part, flow-through holes 5c, 6c are created, which to a certain extent restrict the flow q through the spring 5, 6. A parallel displacement t of the inner spring parts 5a, 6a of the springs is created by the outer spring part 5b, 6b being fastened in a part of the valve housing 2 and by the inner spring part 5a, 6a being fixed in or resting on the axially movable first valve part 4. The parallel displacement can also be realized by the inner spring part being fastened in a part of the valve housing and the outer part being fixed in or resting on the movable first valve part.

In FIGS. 2a-c, the second embodiment of the invention is shown, in which one of the springs, preferably the first spring 5, instead has the form of a regular helical spring 5'. The first end 5a' of the helical spring 5' bears against the movable valve part 4 and the second end 5b' rests on the fastening point of the second spring 6 in the valve housing 2. In this embodiment too, the helical spring 5' acts counter to the actuating force F.

By using a flat and accurate washer-shaped spring as the second spring 6, as in FIGS. 2a-2c, an accurate distance, represented by S3, is attained. The accuracy of the distance S3, in the interaction between actuating force F and spring force, gives a regulator force R, which is independent of tolerances, and also a tolerance-independent minimum pressure level P. The strength of the washer-shaped spring is also that it can be made progressive and gives an increased spring constant the closer the seat 3 comes to the bottom face 4a of the movable valve part. In this position, the actuating force F3 of both springs 5, 6 is counteracted and the regulating spring constant of the valve becomes high and is determined by the two springs in interaction with F3.

The shim springs in question have an open configuration, so that the damping medium flow can flow through cavities arranged in these. This is described in connection with FIG. 4. The first spring 5, too, can need to be very accurate, in which case a shim spring could also be of benefit there, as is shown in FIG. 1.

In the embodiments in FIGS. 1b, 1c, 2b, 2c and 3b, 3c, the second spring 6 bears against the bottom face 4a of the valve part 4 throughout the initial stroke S3. Thus, the valve part 4 and the second spring 6 are not separated from each other before the valve part 4 has moved by a distance greater than the initial stroke S3.

Figure 3A:
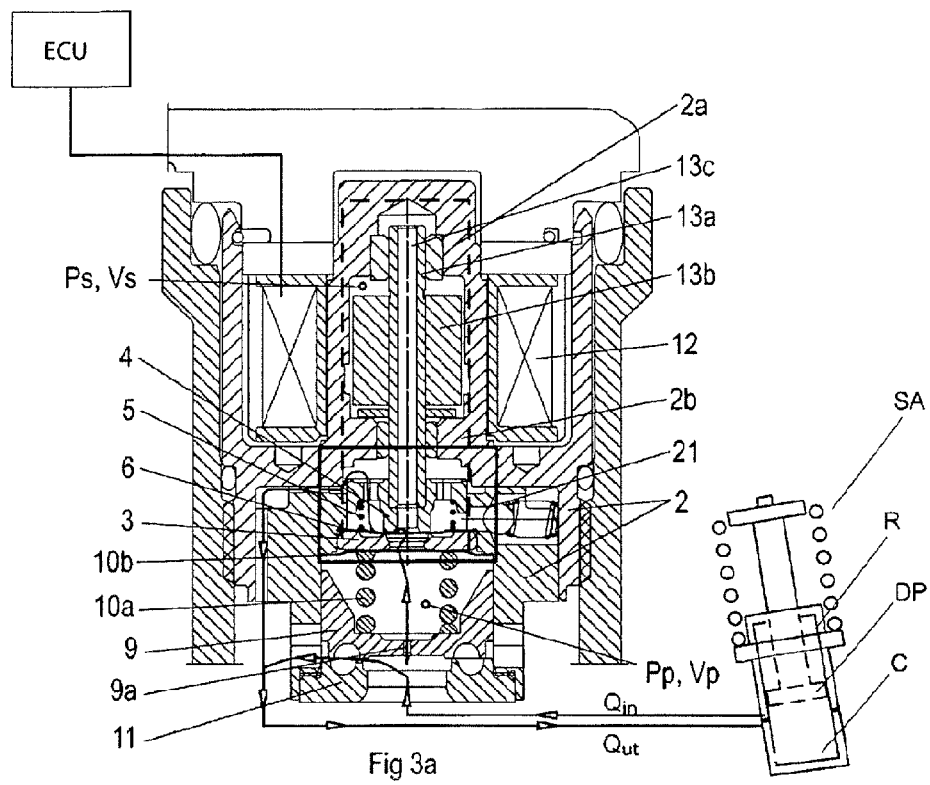

FIGS. 3a-g show a pilot-controlled shock absorber valve. In FIG. 3a, the shock absorber valve is shown coupled with a hydraulic shock absorber SA for a vehicle, in which the valve controls the pressure in a damping medium flow $Q_{in}$, $Q_{ut}$ into, out of or between the two damping chambers C, R of the shock absorber. The flow between the two damping chambers arises through transport of a main piston DP, which is disposed in the absorber body and demarcates the two damping chambers C, R. The flow of the damping medium in the valve is principally determined by the velocity of the main piston DP and by its piston and piston rod diameters. The valve is a one-way valve, in which the flow $Q_{in}$ passes into the valve and the flow $Q_{ut}$ passes out from the valve, i.e. the damping medium flow takes the same route and flows in one direction irrespective of the direction in which the main piston DP moves in the absorber body. The pressure is adjusted via an ECU-controlled continuous electric signal, which controls the power supply to the valve according to working principles described in EP 0 942 195.

The shock absorber valve in FIG. 3a includes a valve housing 2 comprising at least one main valve having an axially movable main cone 9. The main cone 9 is biased by a first main valve spring 10a against a main seat 11. The main cone 9 demarcates a pilot chamber $V_p$ in the valve housing 2, in which the main valve spring 10a and a first pilot valve part 4 are disposed.

The pilot valve part is corresponded to in this case by the abovementioned first movable valve part 4. The main flow $Q_{in}$ creates a pressure on the main cone 9, which creates the opening regulator force R. Once the valve has opened, the main flow passes via an adjustable flow opening between the main seat 11 and the main cone 9 in the direction $Q_{in}$ to $Q_{ut}$. The valve is a two-stage, pilot-controlled valve, which means that the force which opens the main valve is dependent on the pilot pressure arising in the pilot chamber $V_p$. A part of the damping medium flow $Q_{in}$ flows through an inlet hole 9a in the main cone 9 to the pilot chamber $V_p$, so as to increase the pressure in the chamber via the pilot valve part 4.

The main stage comprises a spring arrangement in which the first main valve spring 10a is biased by a second main valve spring 10b and contributes to different spring characters in different parts of the stroke. A low spring constant is used initially at the start of the stroke, so as to transform into a higher spring constant. This is realized by the second main valve spring 10b having a lower spring constant than the first main valve spring 10a, so that when the second main valve spring 10b is fully compressed, the spring force proceeds to instead be determined by the higher spring constant of the first main valve spring 10a. The higher spring constant is better suited to high pressures and dynamic sequences in connection with rapid damping motions. The broken character produces for the main stage a low spring constant close to the closed position with a view to giving a low and accurate setting of the bias, resulting in improved comfort and reduced production spread of minimum pressures. Preferably, the second main valve spring 10b is a shim spring according to FIG. 4b, having an inner and an outer spring part which can spring in relation to each other.

The characteristics of the shock absorber valve are principally controlled by the pressure build-up in the pilot chamber $V_p$, which is adjusted by the position of the first valve part 4, in this case the pilot slide, in the pilot chamber. This is shown in greater detail in FIGS. 3b-3d. An adjustable flow opening arranged to restrict the damping medium flow q is created between the pilot valve seat 3 and the pilot valve part 4 and is further delimited by an inner part 6a of the second spring 6. The flow opening size s and the position of the pilot valve part 4 in the pilot chamber $V_p$ are determined by a force balance on the pilot valve part 4. The force balance is principally created by the sum of the actuating force F and the force Fs from the spring arrangement comprising the first and the second spring 5, 6 counter to the action of the counterholding regulator force R.

Figures 3B, 3C:
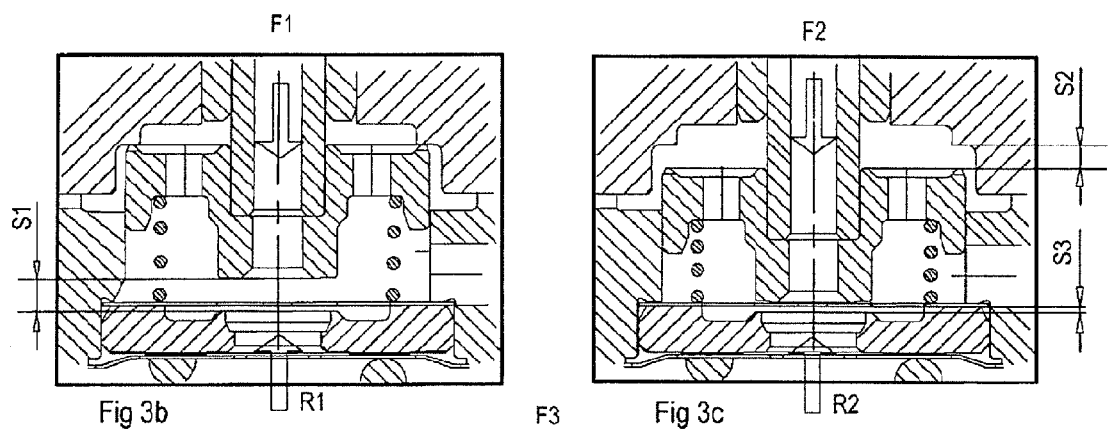
Figure 3D:
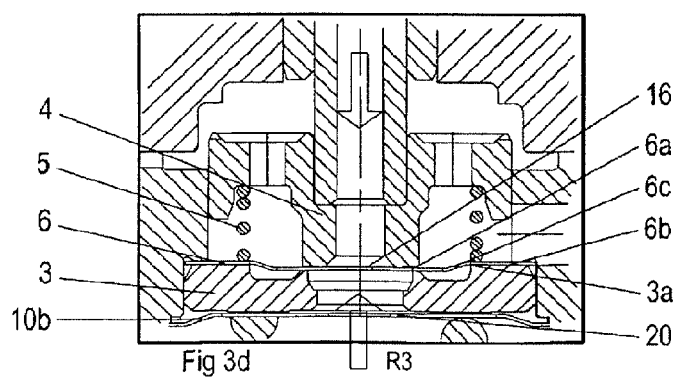

The second spring 6 is of the shim type, i.e. is produced from a thin, circular washer and is configured with an outer 6b and an inner 6a spring part mutually connected with bridges 6d which can spring relative to one another, see FIGS. 3d and 4. Between the bridges 6d and the respective spring part is created the through hole 6c (see FIG. 4). The inner spring part 6a is configured such that it too restricts the flow between the second spring 6 and the parts arranged downstream in the pilot valve and thus has a certain indirect damping action which also gives rise to opening flow forces that affect the force balance. This restriction is realized during the initial stroke S3, when the inner spring part 6a bears against and seals against the first valve part 4. The restriction of the damping medium flow q arises when the damping medium flows in the annular gap with control opening s and in the flow-through holes 6c, thus first through the control opening and then in the interspace between the inner and outer spring part 6a, 6b. The outer spring part 6b is fastened between a part of the valve housing 2 and the pilot seat 3, and the inner spring part 6a rests on the pilot valve part 4 during the initial stroke S3, as is shown in FIGS. 3c and 3d. In the stroke S2, which is larger than the initial third valve part stroke S3, see FIG. 3b, the pilot valve part 4 leaves the inner spring part and its force balance is for the most part dependent on the spring constant k2 of the second spring 6 outside the normal working range and within the stroke S2.

The first spring 5 is a helical spring clamped between the pilot valve part 4 and the outer part 6b of the second spring, which principally bears against the pilot seat 3. The clamp fastening gives a stable mounting of the second spring 6, without risking unwanted dislodging of the spring 6 due to the effect of the pressure. In addition, the first spring 5 is given a contact surface of hard steel, which prevents wear in the seat part 3.

An increased stability margin and small dimensions of incorporated valve components are created by the main stage being wholly or partially forced to copy the behavior of the pilot stage. This is due to the fact that the inlet hole 9a to the pilot chamber is preferably chosen to be small in relation to the pressure-affected area of the main cone 9, at around 0.6-1 mm in diameter, but also in order that the second main valve spring 10b of the shim type is provided with holes (not shown). These holes have been configured such that they create a pressure loss and act as a screen, i.e. they prevent the jet of damping medium which is formed due to the hole 9a from striking with hard force against the regulator surface of the second spring 6 in the pilot valve stage.

The actuating force F is created by an electrically controlled solenoid 12 arranged to regulate the position of the pilot valve part 4, i.e. also the inner part 6a of the second spring, in relation to the outer and the inner pilot seat edge 3a, 3b via a driver 13 which is axially movable in the damping housing 2 and comprises a solenoid armature rod 13a and a solenoid armature body 13b, see FIG. 3a.

In FIGS. 3e and 3f, an enlarged view of the driver 13 and its parts is shown. The solenoid armature rod 13a has a diameter d1 which is smaller than the diameter d2 of the solenoid armature body 13b. When the solenoid armature rod 13a moves axially, it slides against an upper and a lower slide bearing 14a, 14b, which are disposed in the valve housing 2. Between the slide bearings 14a, 14b and the rod 13a there is, for production engineering reasons, a certain optimal first clearance cl1, which, inter alia, contributes to a reduced friction. Through the whole of the solenoid armature rod 13a, a hole 13c extends parallel with the axis of symmetry of the rod 13a. Through this hole 13c, the damping medium can pass to a solenoid chamber $V_s$ disposed in the inner part of the solenoid 12. The damping medium flows through the hole 13c when the solenoid chamber $V_s$ is pressurized.

The size of the actuating force F, corresponding to the summated force Fs on the spring arrangement, is limited for, for example, current limitation and space reasons, i.e. the solenoid design. That is to say, the difference between the forces Fs from the spring arrangement and the actuating force F is limiting for the potential height of the pilot pressure $P_p$. In order to increase the maximum level of the pilot pressure, the area upon which the pilot pressure acts, that is to say the total pressure feedback area A, must be reduced. The total feedback area A is determined by the differential area A=A1−A2; where A1 is the effective first area, with diameter D1, upon which the pilot pressure $P_p$ acts, and A2 is the effective second area, determined by the diameter d1, upon which the damping medium pressure $P_s$ in the solenoid chamber acts. Thus, $A=\pi*(D1^2-d1^2)/4$.

The pressure feedback area A does not have any lower size limit, since the diameters for the respective effective area can be freely chosen, nor, in theory, is there any upper limit for the height to which the pilot pressure $P_p$ can be adjusted. Preferably, only the seat diameter D1 defined by the inner seat edge 3b is used to determine the pressure feedback area. This can be realized by interaction of the inner seat edge 3b with the inner part 6a of the second spring, the diameter dsi of which is preferably always greater than the seat diameter D1, as well as the effect which the intermediate chamber 3c has upon the flow pattern in the gap s, see FIG. 3f. The ability to choose a large number of pressure ranges purely through the choice of dimension of a component is of great importance to the production cost. The pressure feedback is possible by virtue of a hydraulic coupling of pilot chamber Vp and solenoid chamber Vs via the hole 13c in the solenoid armature rod 13a.

The effective second area A2 is in FIG. 3e the upper area of the solenoid armature rod 13a and is thus determined by the outer diameter d1 of the rod 13a. The solenoid chamber Vs is delimited in a first partial chamber by a delimiting part, which in FIG. 3e is configured as a cup 15 arranged around the outer diameter d1 of the solenoid armature rod 13a with a small clearance cl3, but floatingly suspended with a second larger clearance cl2 against the damping housing 2. A small clearance is as small as possible from a production engineering aspect and preferably has a size of between a maximum clearance of 5/1000 and a minimum clearance of 1/1000 of the outer diameter d1. The cup 15 is thus floatingly suspended, but rests against the rear wall in the valve housing 2—thus it does not affect the total motions of the driver 13. The cup 15 is thus arranged such that it delimits the through holes 13c of the solenoid armature rod 13a in that end of the rod which faces away from the movable valve part 4, so that very little damping medium can flow through the hole 13c into the inner parts of the solenoid. The second clearance cl2 corresponds to or is larger than the first clearance cl1, preferably up to three times larger, but this ratio can vary. The cup has the very small third clearance cl3 between its inner diameter and the outer diameter d1 of the solenoid armature rod. A small clearance cl3 is demanded due to low leakage requirements through the inner, dirt-sensitive parts of the solenoid.

In the inner part 6a of the second spring are arranged the flow-through holes 6c, together with a substantially centrally placed restriction hole 16 with diameter d3. The small clearance cl3, in cooperation with the restriction hole 16, results in a certain degree of damping of the motion of the driver 13, the valve part 4 and the inner spring part 6a of the second spring 6.

Since the outer part 6b of the second spring 6 is wedged between the valve housing 2 and the pilot seat 3, it does not move in the pilot slide stroke between the initial stroke S3 and the maximum stroke S1. The transformation from the working position within the initial stroke S3 and to the maximum stroke S1 is realized without damping, since the pilot valve part 4 then relinquishes its contact with the restriction hole 16 and damping medium can flow without limit between the solenoid chamber Vs and a second partial pilot chamber Vp2, instead of just through the flow-through hole 6c and the restriction hole 16. A damping during the motion between the initial S3 and the maximum S1 stroke is preferably not required, since the transformation should occur rapidly.

During the initial stroke, the pilot valve part 4 and the inner part 6b of the second spring 6 are pressed one against the other by a force created by a pressure difference between the solenoid chamber and the pilot chamber. The pressure difference is created by the fact that that area of the inner part 6 of the second spring upon which the solenoid chamber pressure Ps acts has a diameter D3 which is smaller than the effective first area with diameter D1 upon which the pilot pressure $P_p$ acts. Moreover, the solenoid armature rod hole 13c has a lower diameter D2 which is less than the diameter D3. The result of this is that neither are the solenoid armature rod 13a and the pilot valve part 4 separated from each other during the initial stroke S3. The constituent components are thus held together as a unit by virtue of the seat diameters having well-balanced different sizes, in which D3<d1<D1 and D2<d1<D1. The inner part 6a of the second spring thus has a sealing and regulating function during the initial valve part stroke S3 under force action from the valve part 4.

At the same time, the configuration of the inner part 6a of the second spring creates control conditions with high spring constant k2, which also distribute the flow evenly with correct size with regard to occurring flow forces. This is made possible by changing the configuration of the bridges 6d, i.e. by varying the area of the flow-through holes 6c. Moreover, a further restriction/passage of the damping medium flow via the flow-through holes 5c, 6c is created by a suitable choice of flow-through area in this passage.

When the pilot slide/the valve part 4 has moved by the maximum stroke, it lies in an end position against a shoulder 17. In this position, a failsafe mode is created, which ensures that a passage 21 is opened and a certain damping medium flow can flow through the valve even when no current reaches the solenoid and when the main cone 9 bears against and seals against the main seat 11. This solution is also described in Öhlins' patent specification WO2006135319. In order to accelerate transformation between failsafe and normal stroke, the third valve part stroke S2 is made less damped by the first valve part 4 and the second spring 6 being allowed to separate in the pressureless state. If the motion during the initial third stroke S3 is excessively damped by the damping medium restriction through the hole 16, the normally occurring low summated actuating force Fs in this position can produce delays in the opening.

The normal stroke or working stroke of the pressure regulator valve 1 is preferably constituted by the initial stroke S3. The stroke S2 is a transition between the initial stroke S3 and failsafe mode, in which the pilot slide/the valve part 4 bears against the shoulder 17. The axial flatness of the second spring 6 is thus of great importance, since, due to the very accurately machined tolerances of the valve, it constitutes a well-defined starting point for the stroke S3. In hydraulic terms, the starting point in question constitutes the minimum pressure level of the valve. This minimum pressure level, with gradually diminishing stroke S3 and thus increasing solenoid force F3 during the closing process, will define the bleeder-like character with gradually increasing flow rate/pressure at which the valve operates until the valve is in the closed position according to FIGS. 3d-3f. In this closed position, the valve can now, within the force range F2 to F3 with gradually increasing flow/opening pressure, proceed to have the character of a pure pressure regulator.

In FIG. 3f, a preferred embodiment of the delimitation of the solenoid chamber Vs is shown, in which the delimiting part is a washer 18 arranged around the solenoid armature rod 13a, adjacent to the valve housing 2, with a comparable, suitably small third clearance cl3 and a second, larger clearance cl2 around the same.

This design also allows the delimiting part to be free-floating and does not subject the solenoid armature rod 13a to forces and thus friction. The difference in the two embodiments is that this embodiment allows a large damping body, which in this case is the solenoid armature body 13b. Which means that the damping achieved by the restriction in the hole 16 is added to the damping achieved by the damping body 13b, since the whole of the solenoid chamber Vs is now pressurized with the pressure $P_p$. For this embodiment, an improved damping function is thus obtained, which can be realized very effectively due to the large damping diameter d2.

The washer 18 bears against the intermediate part 2b of the valve housing, adjacent to the lower slide bearing 14b.

This means that a contact surface between the valve housing 2 and the washer 18 must be kept closed and seal-tight regardless of the operating situation. The washer is preferably held in place by virtue of the fact that the oil acts with an adhesive force and is acted upon by the static pilot pressure $P_p$, which compresses the washer 18 against the valve housing 2.

A further compressive pressure can be created by the arrangement of a spring 19, see FIG. 3g, between the washer 18 and the solenoid armature body 13b. The spring 19 acts with low force which is always somewhat greater than the intrinsic weight of the washer 18, and with low spring constant so as not to otherwise affect the valve function. The spring 19 is either configured as a helical spring 19—straight or conical, or as a shim spring/cup spring with bent-up arms. Another alternative is that the actual washer 18 has both a sealing and springing function and can then have a shim-like character, preferably in the form of a thin washer with bent-up arms.

The shim springs 5 and/or 6 and 10b according to FIGS. 4a and 4b have the form of a thin, circular washer having an inner 5a, 6a and an outer spring part 5b, 6b. The inner spring part 5a, 6a can be said to have an outer diameter dsi and the outer spring part 5b, 6b has an outer diameter dsy. The two parts are substantially separated from each other by the flow-through holes 5c, 6c, but are held together in at least two places with legs 5d, 6d, so that the outer 5b, 6b and the inner 5a, 6a spring part can spring in relation to each other.

The shim springs 5, 6 are preferably produced from a washer with thickness T which is sufficiently thin that the inner and outer diameter d3, dsy of the spring, and the cavities 5c, 6c between the inner and the outer spring part 5a, 5b/6a, 6b, as well as the central damping hole 16, can be easily etched or punched out from a spring steel plate. The number of legs, leg length, thickness T and leg width can be varied. With a greater number of spring legs, a thinner shim plate can be used, at the same time as the spring 5, 6 acquires a higher spring constant, shorter spring distance, becomes more non-linear and a more compact installation than when a smaller number of spring legs are used.

FIG. 4a shows the second spring 6, which controls the pilot valve stage, and FIG. 4b shows the second main valve spring 10b, which biases the first main valve spring in the main stage of the valve.

In FIG. 4b, the second main valve spring 10b is shown with a centrally arranged screen area. The screen area is in this case a number of, preferably 2-6, holes 20 arranged circularly around the center of the inner spring part of the second main valve spring 10b in such a way that they are arranged displaced from the central cavity 16 of the second spring 6. These holes are arranged in the inner spring part of the second main valve spring 10 in order to screen off the powerful parallel jet from the inlet hole 9a in the main cone 4, which can be formed due to the pressure loss across the hole 9a. In certain operating situations, the pressure loss can be sufficiently high that the damping medium flow Q3, Q2 flows to and fro with a sufficiently large force that it can result in an impaired pilot valve function.

The second main valve spring 10a of the main stage, of which the screen area with holes 20 screens off the powerful parallel jet from the inlet hole 9a and which biases the first main valve spring 10a, can also be used in other types of applications, for example in a shock absorber valve comprising a spring arrangement having a stiff spring in combination with a pliable spring which regulates the position of a movable valve part in the shock absorber valve. The pliable spring here has a dual function and ensures an accurate and low spring force and contributes to different spring characters in different parts of the stroke.

A further advantage and a distinguishing feature of the present damper valve is that the pilot flow Q2, Q3 is kept at low level by deliberately designing the areas of the holes 9a, 6c, 16 and 20 correspondingly small. This produces a high stability margin and small dimensions of incorporated valve components by virtue of the fact that the main stage, to a certain extent, is forced to copy the behavior of the pilot stage. Moreover, an evenly distributed flow inside the pilot system is obtained, which prevents cavitation, swirling and self-induced instability.

The invention can also include an electrically controlled shock absorber valve with low friction, which is insensitive to fouling and which comprises an actuator in the form of a solenoid intended to determine the pressure in a damping medium flow between the damping chambers of a shock absorber. This is possible by virtue of the fact that the diameter of the solenoid armature rod has a first clearance cl1 against the damping housing 2 which is sufficiently large that a hydraulic damping medium flow is formed through the solenoid chamber Vs and in which this damping medium flow is limited by a delimiting part 15, 18 arranged around the solenoid armature rod 13a.

The invention is not limited to the embodiment which is shown above by way of example, but can be modified within the scope of the following patent claims and the inventive concept. For example, this invention can be used also in other types of shock absorber valves, such as various types of one-way or check valves which are biased by springs.

The invention claimed is:

1. A pressure regulator for a shock absorber valve comprising:
    an axially movable first valve part and a first seat, which are arranged in a valve housing in such a way that an adjustable flow opening is created between the first valve part and the first seat, and in which the flow opening is arranged to restrict a damping medium flow and the flow opening size of which is determined by a force balance on the first valve part principally or partially created by the sum of an actuating force and the force from a spring arrangement comprising a first spring having a first spring constant and a second spring having a second spring constant acting upon the movable valve part counter to the action of a counter-holding pressure regulator force,
    wherein the counterholding pressure regulator force is determined by spring characteristics of both the first and the second spring, in which the first spring interacts with the actuating force throughout stroke and the second spring has a limited working range defined by possible axial deformability of the second spring such that it only interacts with the actuating force during an initial stroke;
    wherein the first spring is a shim spring having an inner and an outer spring part which are connected in at least two places to resilient bridges such that the outer and the inner spring part can spring in relation to each other and be displaced relative to each other;
    wherein the pressure regulator is configured to directly regulate a pressure to determine a damping medium flow.

2. The regulator of claim 1, wherein the first valve part and the second spring move in tandem as a unit during the initial stroke until the second spring has reached its basic position.

3. The regulator of claim 2, wherein the first valve part and at least a part of the second spring bear against each other while moving in tandem.

4. The regulator of claim 1, wherein the first spring has a lower spring constant than the spring constant of the second spring.

5. The regulator of claim 4, wherein the first spring has a spring constant of less than 2 N/mm.

6. The regulator of claim 4, wherein the ratio between the first spring constant and the second spring constant is between about 1:6 and 1:220.

7. The regulator of claim 1, wherein the second spring is a shim spring.

8. The regulator of claim 1, wherein the pressure regulator regulates a pilot pressure (Pp) which determines a main damping medium flow across a main valve in the shock absorber valve.

9. The regulator of claim 1, wherein in the initial stroke is close to the seat and defined by the limited working range of the second spring.

10. The regulator of claim 1, wherein in the second spring is arranged in parallel with the first spring and works in said initial stroke close to the seat.

11. A hydraulic shock absorber for a vehicle suspension comprising:
   at least one chamber;
   a shock absorber valve; and
   a pressure regulator for said shock absorber valve arranged to control a damping medium flow to/from said at least one chamber, said pressure regulator including:
      an axially movable first valve part and a first seat, which are arranged in a valve housing in such a way that an adjustable flow opening is created between the first valve part and the first seat, and in which the flow opening is arranged to restrict a damping medium flow and the flow opening size of which is determined by a force balance on the first valve part principally or partially created by the sum of an actuating force and the force from a spring arrangement comprising a first spring having a first spring constant and a second spring having a second spring constant acting upon the movable valve part counter to the action of a counterholding pressure regulator force,
   wherein the counterholding pressure regulator force is determined by spring characteristics of both the first and the second spring, in which the first spring interacts with the actuating force throughout stroke and the second spring has a limited working range defined by possible axial deformability of the second spring such that it only interacts with the actuating force during an initial stroke;
   wherein the pressure regulator is configured to directly regulate a pressure to determine a damping medium flow.

12. The hydraulic shock absorber of claim 10, wherein the first valve part and the second spring move in tandem as a unit during the initial stroke until the second spring has reached its basic position.

13. The hydraulic shock absorber of claim 11, wherein the first spring has a lower spring constant than the spring constant of the second spring.

14. The hydraulic shock absorber of claim 13, wherein the first spring has a spring constant of less than 2 N/mm.

15. The hydraulic shock absorber of claim 13, wherein the ratio between the first spring constant and the second spring constant is between about 1:6 and 1:220.

16. The hydraulic shock absorber of claim 11, wherein the first spring and/or the second spring is a shim spring.

17. The hydraulic shock absorber of claim 11, wherein the pressure regulator regulates a pilot pressure (Pp) which determines a main damping medium flow across a main valve in the shock absorber valve.

18. The hydraulic shock absorber of claim 11, wherein in the initial stroke is close to the seat and defined by the limited working range of the second spring.

19. The hydraulic shock absorber of claim 11, wherein in the second spring is arranged in parallel with the first spring and works in said initial stroke close to the seat.

20. A pressure regulator for a shock absorber valve comprising:
   an axially movable first valve part and a first seat, which are arranged in a valve housing in such a way that an adjustable flow opening is created between the first valve part and the first seat, and in which the flow opening is arranged to restrict a damping medium flow and the flow opening size of which is determined by a force balance on the first valve part principally or partially created by the sum of an actuating force and the force from a spring arrangement comprising a first spring having a first spring constant and a second spring having a second spring constant acting upon the movable valve part counter to the action of a counterholding pressure regulator force,
   wherein the counterholding pressure regulator force is determined by spring characteristics of both the first and the second spring, in which the first spring interacts with the actuating force throughout stroke and the second spring has a limited working range defined by possible axial deformability of the second spring such that it only interacts with the actuating force during an initial stroke;
   wherein the pressure regulator is configured to directly regulate a pressure to determine a damping medium flow.

* * * * *